United States Patent
O'Toole, Jr.

(12)
(75) Inventor: James W. O'Toole, Jr., Somerville, MA (US)
(73) Assignee: Cisco Technology, Inc., San Jose, CA (US)
(*) Notice: Subject to any disclaimer, the term of this patent is extended or adjusted under 35 U.S.C. 154(b) by 1335 days.

(10) Patent No.: US 7,565,413 B1
(45) Date of Patent: Jul. 21, 2009

(54) CONTENT REQUEST REDIRECTION FROM A WED PROTOCOL TO A FILE PROTOCOL (21) Appl. No.: 10/212,421
(22) Filed: Aug. 5, 2002
(51) Int. Cl.
  G06F 13/00 (2006.01)
(52) U.S. Cl. ..................... 709/219
(58) Field of Classification Search ......... 709/203, 709/219, 238; 370/389, 401
  See application file for complete search history.

(56) References Cited

U.S. PATENT DOCUMENTS

| 5,265,261 | A  | * | 11/1993 | Rubin et al. | 709/235 |
|---|---|---|---|---|---|
| 5,838,916 | A  | * | 11/1998 | Domenikos et al. | 709/219 |
| 5,875,296 | A  |   | 2/1999  | Shi et al. | 395/188.01 |
| 5,918,228 | A  |   | 6/1999  | Rich et al. | 707/10 |
| 6,052,730 | A  | * | 4/2000  | Felciano et al. | 709/225 |
| 6,081,900 | A  |   | 6/2000  | Subramaniam et al. | 726/19 |
| 6,119,153 | A  | * | 9/2000  | Dujari et al. | 709/218 |
| 6,185,598 | B1 | * | 2/2001  | Farber et al. | 709/200 |
| 6,185,619 | B1 | * | 2/2001  | Joffe et al. | 709/229 |
| 6,233,618 | B1 | * | 5/2001  | Shannon | 709/229 |
| 6,341,352 | B1 |   | 1/2002  | Child et al. | 713/201 |
| 6,370,584 | B1 | * | 4/2002  | Bestavros et al. | 709/238 |
| 6,393,468 | B1 |   | 5/2002  | McGee | 709/218 |
| 6,658,476 | B1 | * | 12/2003 | Van | 709/230 |
| 6,735,186 | B1 | * | 5/2004  | Leppinen | 370/338 |
| 6,742,082 | B1 | * | 5/2004  | Lango et al. | 711/118 |
| 6,759,973 | B2 | * | 7/2004  | Villaret et al. | 341/11 |
| 6,785,704 | B1 | * | 8/2004  | McCanne | 718/105 |
| 6,842,770 | B1 | * | 1/2005  | Serlet et al. | 709/203 |
| 6,850,986 | B1 | * | 2/2005  | Peacock | 709/232 |
| 6,857,012 | B2 | * | 2/2005  | Sim et al. | 709/222 |
| 6,938,096 | B1 | * | 8/2005  | Greschler et al. | 709/239 |
| 6,985,936 | B2 | * | 1/2006  | Agarwalla et al. | 709/221 |
| 6,985,956 | B2 | * | 1/2006  | Luke et al. | 709/229 |
| 7,076,555 | B1 | * | 7/2006  | Orman et al. | 709/227 |
| 7,114,008 | B2 | * | 9/2006  | Jungck et al. | 709/246 |
| 7,149,222 | B2 | * | 12/2006 | Wiryaman et al. | 370/401 |

(Continued)

OTHER PUBLICATIONS

Cisco Systems, "Web Cache Communication Protocol Version 1", 2001, Cisco Cache Software Configuration Guide, chapter 3, 22 pages.*

(Continued)

Primary Examiner—Robert B Harrell
(74) Attorney, Agent, or Firm—BainwoodHuang (57) ABSTRACT A method and apparatus for routing a data request in a content delivery network receives a Hypertext Protocol (HTTP) format client data request and redirects the client data request to a file transfer protocol such that the data is transferred to the client in the file transfer protocol rather than HTTP. The redirection from HTTP, for example, to FTP or some other fileserver protocol outsources the load on the content engines while taking advantage of well-established methods of data handling and security. In addition, the network can dynamically be provisioned to handle a data load. In one embodiment, WCCP and HTTP redirection methods are used separately or in combination to provide a distributed file system in which client's requests benefit from content routing prior to interacting (via a file protocol) with a file server.

26 Claims, 7 Drawing Sheets

U.S. PATENT DOCUMENTS

| | | | | |
|---|---|---|---|---|
| 7,161,947 | B1* | 1/2007 | Desai | 370/401 |
| 2001/0030970 | A1* | 10/2001 | Wiryaman et al. | 370/401 |
| 2002/0009079 | A1* | 1/2002 | Jungck et al. | 370/389 |
| 2003/0023729 | A1* | 1/2003 | Foster | 709/226 |
| 2003/0046335 | A1* | 3/2003 | Doyle et al. | 709/203 |
| 2003/0149746 | A1* | 8/2003 | Baldwin et al. | 709/219 |
| 2003/0187976 | A1* | 10/2003 | Decime | 709/224 |
| 2003/0237016 | A1* | 12/2003 | Johnson et al. | 714/4 |
| 2004/0019678 | A1* | 1/2004 | St. Pierre et al. | 709/225 |
| 2004/0128346 | A1* | 7/2004 | Melamed et al. | 709/203 |
| 2004/0255048 | A1* | 12/2004 | Lev Ran et al. | 709/249 |

OTHER PUBLICATIONS

Nikhl Chandhok, "Web Distribution Systems: Caching and Replication", http:/www.cse.wustl.edu/~jain/cis788-99/web_caching/index.html, Nov. 18, 1999, 28 pages.*

Sylvia Elliott, "Caching in on Web surfing", Summer Semester 2001, Computer Review, University Computing and Networking Services, 3 pages. Cooper et al., "Internet Web Replication and Caching Taxonomy", RFC 3040, Jan. 2001, Network Working Group, 32 pages.*

Nikhil Chandhok, "Web Distribution Systems: Caching and Replication", Feb. 7, 2000, Ohio State Education, 22 pages. Linderman et al., "Evaluating Coorparative Web Caching Protocols for Emerging Network Technologies", University of Dorumund, Germany, 9 pages.*

Cisco Systems, "Cisco Applciation and Content Neworking System (ACNS) Software v4.2 Product Family: Enterprise Edition", Datasheet, Cisco Systems, Inc., 16 pages. Christophe Deleuze, "Content Networks", Cisco Systems, Inc., The Internet Protocol Journal, vol. 7, No. 2, 1992-205, 6 pages.*

Callaghan Brent, "NFS URL Scheme", RFC 2224, Oct. 1997, Sun Microsystems, Inc., 11 pages.*

Callaghan, B., Public NFS, NFS Group, Sun Microsystems, Inc., http://www.connectathon.org/talks96/public.pdf, pp. 1-15, Feb. 26, 1996.*

Callaghan, B., WebNFS: The Filesystem for the Internet, Sun Microsystems, Inc., http://www.connectathon.org/talks97/brent1.pdf, pp. 1-14, Mar. 3, 1997.*

Talks @ Connectathon '97, www.connectathon.org/talks97, pp. 1-2, downloaded Sep. 23, 2007.*

* cited by examiner

|  | NFS | CIFS |
|---|---|---|
| AUTOMOUNT | 300<br><br>AUTOMOUNT WITH AUTOMOUNTER DAEMONS | 310<br><br>WHERE A LOCALLY AVAILABLE FILESERVER IS NAMED IN RETURNED URL, CLIENT WILL CONNECT TO THE FILESERVER |
| MANUAL | 305<br><br>MOUNT MANUALLY AT SYSTEM CONFIGURATION | 315<br>CONFIGURE CLIENTS WITH SEVERAL STANDARDIZED NETWORK DRIVERS (G:, H:, I:, J:); ALTERNATIVELY, USE A STANDARD SET OF MANUALLY CONFIGURED FILESERVER NAMES (SUCH AS \\G-SERVER, \\H-SERVER, \\I-SERVER) |

CONTENT REQUEST REDIRECTION FROM A WED PROTOCOL TO A FILE PROTOCOL

BACKGROUND OF THE INVENTION

In general, a content delivery network (CDN) is a network of servers that delivers a Web page to a user based on the geographic locations of the user, the origin server of the Web page and local servers. Within the CDN, copies of the pages of a Web site are stored in local servers called content engines that are dispersed at geographically different locations, caching the contents of the Web page. Content routers in the CDN route user requests to an appropriate content engine. When a user requests a Web page that is part of a CDN, the CDN redirects the request from the originating site's server to a server in the CDN that is closest to the user and delivers the cached content from that closest server. The CDN also communicates with the originating server to deliver any content that has not been previously cached. This service is effective in speeding the delivery of content of Web sites with high traffic and Web sites that have global reach. Typically, the closer the content engine is to the user geographically, the faster the content will be delivered to the user. CDNs can also be configured to provide protection from large surges in traffic.

Content distribution and management (CDM) is the proactive distribution of cachable content from origin servers to content engines at the edges of a network, and the maintenance required in keeping the content fresh.

Content routing directs a user request to the optimal resource within a global network based on user-defined policies such as rules for specific content, availability of content, health or current loads for Web servers or caches, and various other network conditions. Content routing is also referred to as "request redirection."

Content switching provides a robust front end for Web server farms and cache clusters, performing functions such as local and global load balancing of user requests, and policy-based Web traffic direction based on full visibility of URLs, host tags, cookies and perhaps other content information.

Content edge delivery is a CDN service that caches select content from origin servers and delivers specific content to a requesting user.

The Domain Name System (DNS), also referred to as the Domain Name Service, is an Internet service that translates domain names into IP addresses. The DNS system is its own network. If one DNS server does not know how to translate a particular domain name, it asks another DNS server, and so on, until the correct IP address is returned.

HyperText Transfer Protocol (HTTP) is the underlying protocol used by the World Wide Web. HTTP defines how messages are formatted and transmitted, and what actions Web servers and browsers should take in response to various commands. HTTP is called a stateless protocol because each command is executed independently, without any knowledge of the commands coming before it.

A Uniform Resource Locator (URL) is the global address of documents and other resources on the World Wide Web and other networks using similar protocols. The first part of the address indicates what protocol to use, and the second part specifies the IP address or the domain name where the resource is located. For example, the following URL, http://www.test.com/ indicates that the protocol to be used is HTTP and that the address of the resource is www.test.com.

Transmission Control Protocol (TCP) is a network protocol. TCP enables two hosts to establish a connection and exchange streams of data. TCP guarantees delivery of data and also guarantees that packets will be delivered in the same order in which they were sent. Internet Protocol (IP) specifies the format of packets, also called datagrams, and the addressing scheme. The protocols combined as TCP/IP establish a connection between two hosts so that the hosts can send messages back and forth for a period of time.

The Web Cache Communication Protocol (WCCP), developed by Cisco Systems, of San Jose, Calif., specifies interactions between one or more routers (or Layer 3 switches) and one or more web-caches. The purpose of the interaction is to establish and maintain the transparent redirection of selected types of traffic flowing through a group of routers. The selected traffic is redirected to a group of web-caches with the aim of optimizing resource usage and lowering response times.

File Transfer Protocol (ftp) is the Internet protocol for transferring files.

Network File System (NFS) is a client/server application designed by Sun Microsystems that allows all network users to access shared files stored on computers of different types. NFS provides access to shared files through an interface called the Virtual File System (VFS) that runs on top of TCP/IP. Users can manipulate shared files as if the files were stored locally on the user's own hard disk. With NFS, computers connected to a network operate as clients while accessing remote files, and as servers while providing remote users access to local shared files.

Common Internet File System (CIFS) defines a standard for remote file access. CIFS, like NFS, enables users with different platforms and computers to share files without having to install new software. CIFS, like NFS, can run over TCP/IP but it uses the server message block (SMB) protocol found in Microsoft Windows for file and printer access. CIFS and NFS are used by many applications, including Web browsers, to open and operate on files. Implementations of CIFS and NFS generally provide better support for file access control, file attributes, directory operations, file modifications, and random I/O access patterns in comparison to HTTP.

There are CDN systems that use content routing involving DNS and HTTP messages to route a client's request for web content to a preferred server that will fulfill the client request. There are distributed file system implementations in which clients communicate with a server, and that server complies with a distributed file cache coherency protocol to implement a multi-replica file system, along with one or more other servers that may store the same files. Examples of current distributed file systems include the Andrew File System (AFS) available from the Andrew Consortium at the School of Computer Science at Carnegie Mellon University in Pittsburgh, Pa. and Coda, also developed at Carnegie Mellon University.

Current technology is able to use WCCP to capture DNS and HTTP requests traveling through a network near a particular content engine, and (at the cost of processing 100% of such requests) to process some of those requests locally.

SUMMARY OF THE INVENTION

Current technology of content distribution in networks suffers from a number of deficiencies. For example, data transfer using the HTTP protocol can be slow while file transfer using file transfer protocols can be quicker and, because they are typically older and more developed, file transfer protocols are generally more reliable and secure. Also, a CDN using the HTTP protocol the majority of the time has a limited ability to respond to changes in load in the network.

According to principles of the present invention, Web server URLs in a content delivery network are converted by content engines to fileserver URLs. The redirection from HTTP, for example, to FTP or some other fileserver protocol outsources the load on the content engines while taking advantage of well-established methods of data handling and security. In addition, the network can dynamically be provisioned to handle a data load. In the present invention, WCCP and HTTP redirection methods are used separately or in combination to provide a distributed file system in which client's requests benefit from content routing prior to interacting (via a file protocol) with a file server. Redirection of an HTTP request to a file protocol is a way to arrange to process some requests on a local content engine without incurring the cost of (potentially multiple) HTTP redirections. The HTTP, WCCP, and FTP protocols are provided merely as example protocols. The invention is not limited to the protocols listed herein.

In one embodiment of the invention, a client requests access to a file named by a URL via HTTP. HTTP redirection is used for selecting the best of a plurality of content engines in the content delivery network to respond to the client's request. The content routing request redirections has completed when the client makes its final HTTP request to the content engine chosen to fulfill the client request. The last server, instead of delivering the file data in a read-only mode via HTTP, issues another redirection of the form:

file://mount-path/directory/file-name.ext

This redirection causes the client to cease using HTTP to obtain the contents of the file and instead commence using a file protocol such as NFS or CIFS to access the file that is indicated in the protocol portion of the URL.

The "mount-path" is calculated by the content engine based on the identity of the client, the configuration parameters that describe whether the client shall be using NFS or CIFS to access files or some other file access protocol, and how the client has been configured to mount file server volumes such as the volume exported by the particular content engine. For example, in one arrangement, the "mount-path" relies on the use of known automount methods in which the hostname or IP address of the content engine is apparent in the mount-path.

In an alternative embodiment of the invention, the next-to-last server (or content router) provides the HTTP redirection containing the URL in the "file:" format, instead of redirecting to the content engine (which is the last server) and having the content engine provide that redirection. This alternative embodiment can save one redirection, but requires that client-server file protocol configuration information sufficient to calculate the "mount-path" be stored in the content routers or that it be communicated to the content routers by the content engines.

Another alternative embodiment of the invention is to rely on WCCP instead of HTTP redirection to cause the HTTP request to reach the desired content engine. Alternatively, other interception-based distributed server-selection methods may be used to redirect the HTTP request to a content engine having the requested data content.

Another alternative embodiment of the invention uses WCCP to capture and process the packets of the file protocol. In this embodiment, clients are configured to mount a CDN's file contents using NFS or CIFS, using a standardized local (or global) virtual-IP address. WCCP is configured to capture the UDP (or TCP) traffic destined for that IP address and deliver those packets to the nearby content engine. At the cost of handling 100% of these incoming file-protocol packets, a load-balancing cluster of content engine forwards these packets to a "best" content engine selected through the use of content-routing methods or similar server-selection methods. The content engine receiving the packets performs the requested file-protocol operation and transmits the reply to the client, possibly via the WCCP-enabled proxy.

More specifically, embodiments of the invention provide methods and apparatus that redirect HTTP URLs to file transfer protocol URLs enabling data transfer to take place using the file transfer protocol rather than the Web protocol. In one embodiment of the invention, a data request in a Web protocol from a client is received at a network server, a file protocol redirection is substituted for the Web protocol data request and data is transferred to the client using the file protocol. In one arrangement, the Web protocol is HTTP. In another arrangement, the Web protocol is WCCP. In another arrangement, both HTTP and WCCP are used in combination. There are several possible file transfer protocols to use in the present invention. In one arrangement, the file transfer protocol is FTP. In another arrangement, the file transfer protocol is CIFS. In another arrangement, the file transfer protocol is NFS. Further, in one arrangement of the invention, the file protocol used is selected in response to the identity of the client. In another arrangement, the file protocol is determined in response to client configuration. The network server performing the redirection is a content engine in one arrangement of the invention. In another arrangement, the network server is a network attached storage device.

Another embodiment of the invention is a method for redirecting an HTTP message to another data protocol in a content delivery network (CDN), where the CDN receives an HTTP data request from a client, directs the request to a content engine, the content engine redirects the request from HTTP to a file transfer protocol and than transfers data to the client using the file transfer protocol. The content engine sends a mount path to the client in order to accomplish data transfer. In a first arrangement, the mount path is determined by the identity of the client. In a second arrangement, the mount path is determined by the client configuration. Further, the HTTP request is intercepts at a router in the CDN where the request is redirected to the file transfer protocol.

A further embodiment of the invention includes a system for routing a data request including a content delivery network having at least one content engine. In this further embodiment, the content delivery network intercepts a client data request in a first transfer protocol from a client and redirects to a second data transfer protocol and transmits data using the second data transmission protocol to the client.

Another embodiment of the invention is a system for providing access to a shared fileserver where the shared fileserver is attached to a wide area network and two or more local area networks are also attached to the wide area network. A first router in the first local area network intercepts a client data request in a web protocol, where the client data request is directed to the shared fileserver. The first router redirects the client data request to a first cache connected to the first local area network. The first cache redirects the client data request to a file transfer protocol and transfers data to the client using the file transfer protocol. The client can be moved to the second local area network and can access the shared fileserver through the second router and second cache in the same way as on the first local area network because the redirection provides a universal naming structure making the shared fileserver accessible from anywhere in the network.

Another embodiment of the invention provides a system for load balancing in a network through data request routing where a content delivery network has data addressable through a virtual Internet Protocol address. A plurality of content engines is connected to the content delivery network as well as a router. The router redirects a client request addressed to the virtual Internet Protocol address to the plurality of content engines. The plurality of content engines select a particular content engine from the plurality of content engines to handle the client request based on network load. The selected content engine redirects the client request from the virtual Internet Protocol address to a file protocol and transfers data to the client in response to the client request.

Another embodiment of the invention combines a CDN with a distributed file system. In that embodiment the CDN has a plurality of fileservers and a content engine. The CDN intercepts and redirects a client data request in a first transfer protocol from a client to the content engine. The content engine redirects the client data request to a second data transfer protocol and determines which of the plurality of fileservers contains the requested data. The content engine redirects the client data request in the second data transfer protocol to the determined fileserver. The fileserver transmits the requested data using the second data transmission protocol to the client.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

According to principles of the present invention, Web server URLs in a content delivery network are converted by content engines to fileserver URLs. The redirection from HTTP, for example, to FTP or some other fileserver protocol outsources the load on the content engines while taking advantage of well-established methods of data handling and security. In addition, the network can dynamically be provisioned to handle a data load. In the present invention, WCCP and HTTP redirection methods are used separately or in combination to provide a distributed file system in which client's requests benefit from content routing prior to interacting (via a file protocol) with a file server.

Specifically, a client request in HTTP format is intercepted in the content delivery network and redirected to a content engine. The content engine responds to the intercepted HTTP request with a protocol redirection redirecting client data access through a file transfer protocol instead of HTTP protocol. For example, the content server redirects the URL request to FTP. The redirection from HTTP to FTP or some other file protocol outsources the load on the content engines while taking advantage of well-established methods of data handling and security. In addition, the network can dynamically be provisioned to handle a data load. In the present invention, WCCP and HTTP redirection methods are used separately or in combination to provide a distributed file system in which client's requests benefit from content routing prior to interacting (via a file protocol) with a file server. Redirection of an HTTP request to a file protocol is a way to arrange to process some requests on a local content engine without incurring the cost of (potentially multiple) HTTP redirections.

Figure 1:
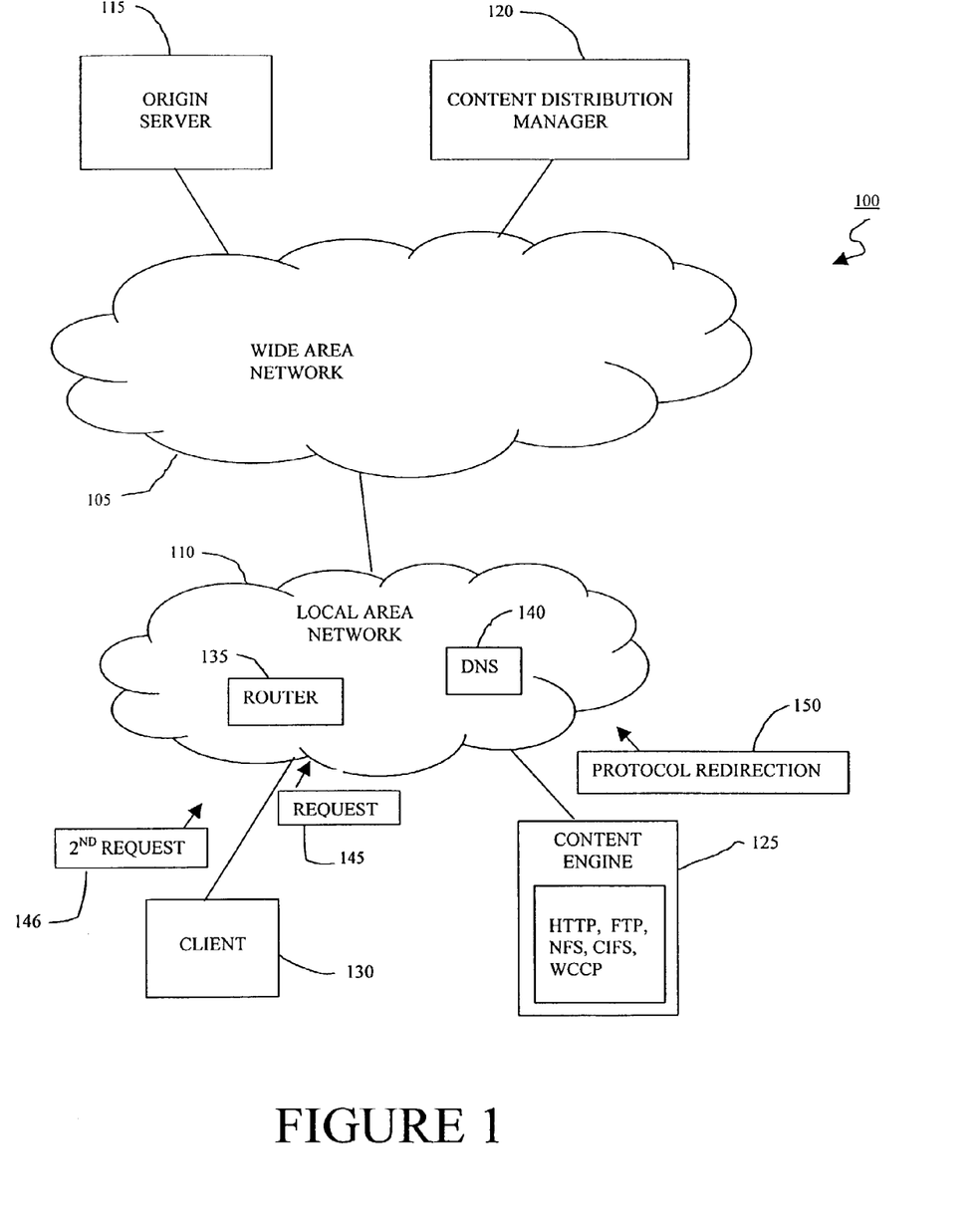
FIG. 1 is a block diagram of a system including a content delivery network operating according to principles of the present invention.

FIG. 1 shows a content delivery network (CDN) 100 operating according to principles of the present invention. The CDN 100 has a wide area network (WAN) 105 and a local area network (LAN) 110. An origin server 115 and a content distribution manager (CDM) 120 are connected to the WAN 105. A content engine 125 and a client 130 are connected to the LAN 110. Further, the LAN 110 has a router 135 and a DNS server 140.

Certain data, such as certain data stored on the origin server 115, is configured to be replicated within the CDN 100. This data is duplicated onto the content engine 125. While only one content engine is shown in FIG. 1, typically there is a plurality of content engines, also referred to as edge servers, present in a CDN. The CDN 100 has management control of all CDN servers, including routers and content engines, and of replication of content into the content engines including bandwidth controls, etc.

The present invention uses request routing, also referred to as content routing, in order to redirect a client request 145. Redirection involves intercepting the client request 145 at some point in the network between the client requesting the information and the server to which the client directed the request 145. The intercepted client request 145 is then directed to some other source of the requested data in order to provide the requesting user the optimal data resource. An intermediate point involved in intercepting a client request 145 is, for example, a router, such as a WCCP-enabled router. Alternatively, the DNS system or the CDM 120 could be used to intercept and redirect the client's request 145.

Returning to FIG. 1, the client request 145 is redirected to the content engine 125. In the case of request redirection using the DNS system, the client request 145, which is originally directed to, for example, the origin server 115 is sent from the client 130 into the LAN 110. Inside the LAN 110, the request 145 goes to the DNS server 140. The DNS server 140 responds by directing the client request 145 to the content engine 125 rather than the origin server 115. Alternatively, the request 145 could go to the CDM 120 or to the router 135 using a content routing technique, such as Boomerang, developed at Cisco Systems of San Jose, Calif. When Boomerang is used, an initial request 145 is processed by a content router and then forwarded (in multiple copies) to several other content routers operated so as to respond almost simultaneously to the client 130 (or the client's DNS proxy server) with one of these several responses (typically the earliest arriving) being used by the client (or DNS proxy) to select the particular content server to be used for further processing of the request. Alternatively, the request is intercepted by the router 135 enabled with WCCP and directed to the content engine 125. All these schemes result in a client request in a web server protocol such as HTTP being served to a content engine 125.

In this embodiment of the invention, the client request 145 is a URL of the following format: http://routed domain name/path/extension. The request 145 is routed through the DNS system and, in conventional systems, the client 130 is eventually returned data delivered using the HTTP protocol. In the present embodiment, however, the client 130 is returned a response in HTTP format redirecting the client to a file transfer protocol. That is, the content engine, instead of delivering the file data in a read-only mode via HTTP, issues another redirection 150 of the form: file://mount-path/directory/filename.ext. The client sends a second client request 146 in response to the redirection 150 requesting data using a file server protocol such as NFS or CIFS as specified in the redirection to access the file.

The "mount-path" is calculated by the content engine 125 based on the identity of the client, the configuration parameters that describe whether the client 130 shall be using NFS or CIFS to access files or some other file access protocol, and how the client has been configured to mount file server volumes such as the volume exported by the particular content engine. For example, the "mount-path" may rely on the use of known automount methods in which the hostname or IP address of the content engine is apparent in the mount-path.

Figure 2:
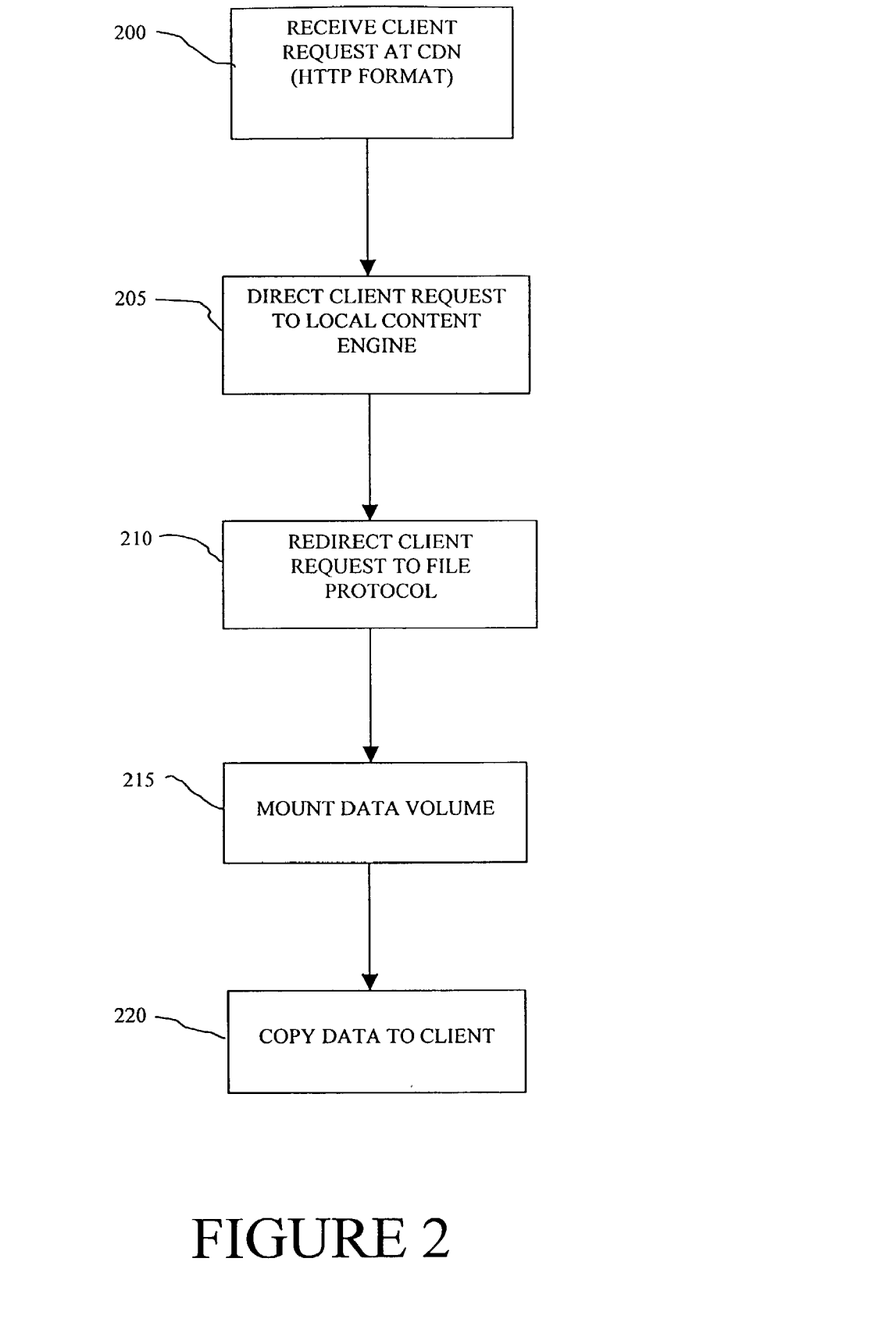
FIG. 2 is a flow chart of the operation of the content delivery network of FIG. 1.

FIG. 2 is a flow chart of the operation of the content delivery network shown in FIG. 1.

In step 200, the client 130 sends a request into the network 105, 110 where the client request 145 is intercepted at some point between the client 130 and the origin server 115.

In step 205, the client request 145 is redirected to a content engine 125 preferably local to the client 130. A number of alternative embodiments are possible. In a first alternative embodiment, the origin server 115 receives the request and redirects the request 145 to a content engine 125 local to the client 130. In a second alternative embodiment, the CDN-enabled router 135 intercepts the client request 145 and redirects the request 145 to the local content engine 125. In a third alternative embodiment, the DNS system in the networks 105, 110 intercepts the client request 145 and redirects it to the content engine 125. In any of these embodiments, the CDN distribution manager 120 controls the CDN servers directing the redirection away from the origin server 115 to the content engine 125.

In step 210, the content engine 125 redirects the client request 145 URL to a file transfer protocol such as FTP. That is, the URL is converted to a file access path that tells the client to use a file access protocol to request the data. To specify the FTP access protocol, typically the format would be "ftp://hostname/path/directory/filename.ext", for NFS or CIFS, typically the format would be "file://mount-path/directory/filename.ext". Alternative protocols include other non-HTTP or HTTP-layered protocols such as DAFS (Direct Access File System) or WebDAV (Web Distributed Authoring and Versioning, a file operating protocol layered on HTTP), which use similar formats to those provided above. The redirection 150 tells the client to stop using HTTP to obtain the contents of the file and instead to start using a file protocol FTP.

In step 215, the client connects the appropriate data volume. That is, the client puts in place the appropriate mechanisms to interface with the content engine using the redirected file transfer protocol. These mechanisms are well known in the art.

In step 220, the client copies the data using the redirected file transfer protocol.

Figure 3:
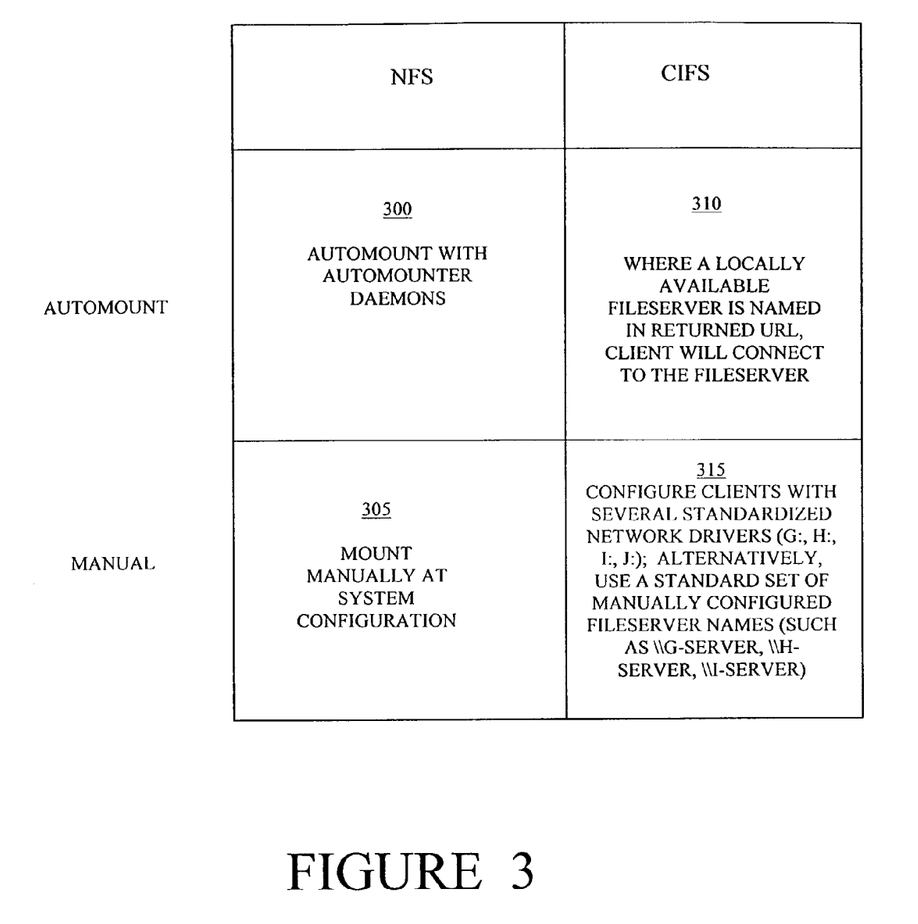
FIG. 3 is a table of client system configurations according to principles of the present invention.

FIG. 3 illustrates the configuration of the client in a system such as the system shown in FIG. 1. FIG. 3 is a table of client system configurations for the NFS and the CIFS protocols. When the file protocol is NFS, the client running automounter daemons can automount the data volume specified in the protocol redirection, cell 300. Alternatively, the data volume can be manually mounted at the time of client system configuration, cell 305. Where the protocol is CIFS, CIFS clients will automatically connect to locally available fileservers if the fileserver is named in the URL received by the client in response to the client request, cell 310. Manual mounting under CIFS involves installing a set of drivers on the client in order to interface to different mount points (e.g. G:, H:, I:, J:), cell 315. Alternatively, manual mounting involves using standard names for fileservers in each network area as described below.

Figure 4:
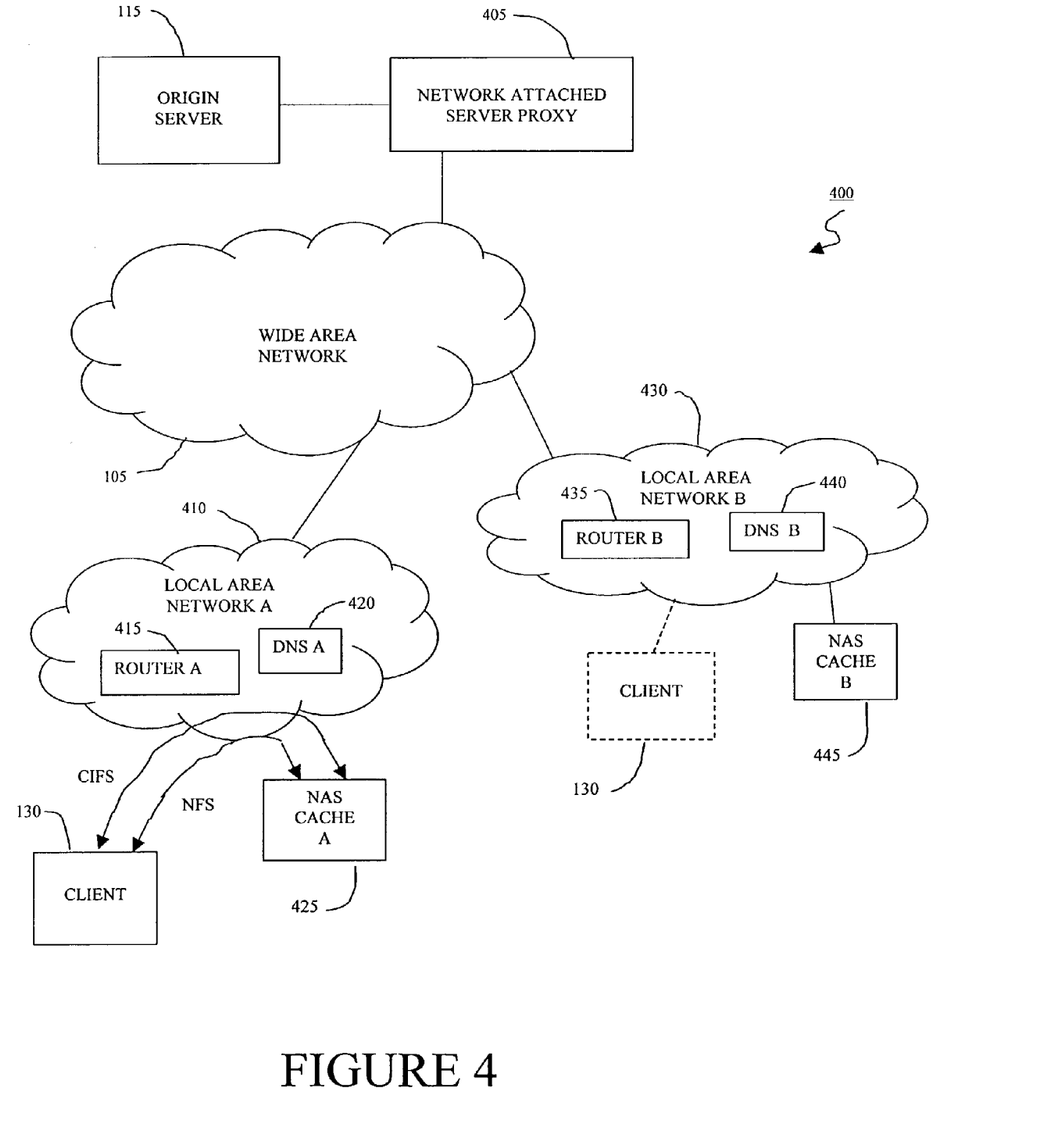
FIG. 4 is a block diagram of an alternative embodiment of the content delivery network of FIG. 1.

FIG. 4 shows an alternative embodiment of the system of FIG. 1. The CDN 400 of FIG. 4 has a WAN 105 connected to LAN A 410 and to LAN B 430. The origin server 115 is connected to the WAN 105 through a network attached storage (NAS) proxy server 405. LAN A 410 and LAN B 430 each has a router 415, 435 and a DNS server 420, 440. NAS cache A 425 is connected to LAN A 410. NAS cache B 445 is connected to LAN B 430. The client 130 is connected to LAN A 410.

In this embodiment of the invention, the origin server 115 is configured as a file server. The origin server 115 interfaces to the alternative CDN 400 through the NAS proxy server 405. The client 130 mounts the NAS cache A 425 through NFS mount or CIFS driveshare. A user working through the client 130 uses the NAS cache A 425, but all data is actually saved to the origin server 115. In this way all the data is remotely backed up. The user may use any cache in the CDN network 400.

This type of CDN is used, for example, in an enterprise storage network where LAN A 410 is the local area network of one building occupied by a company and LAN B 430 is the local area network of a second building occupied by the company. It is desirable, in this type of network application, to be able to move the client system 130, for example, a laptop computer, from building to building (i.e. from LAN to LAN) and still have access to central files. The same file name, however, cannot be used everywhere. In the CDN system, replication keeps the file system contents synchronized and redirection enables the clients to use a single uniform naming scheme to access the same content from many possible client and many possible server locations. The CDN system redirects URLs to local content engines, which in the example configuration shown in FIG. 4 is an NAS cache 425, 445. The NAS caches 425, 445 redirect HTTP pathnames to a file:// mountpath names. This switches the client from an HTTP protocol to a file protocol. The client 130 has the mount names to handle the file pathnames.

Figure 5:
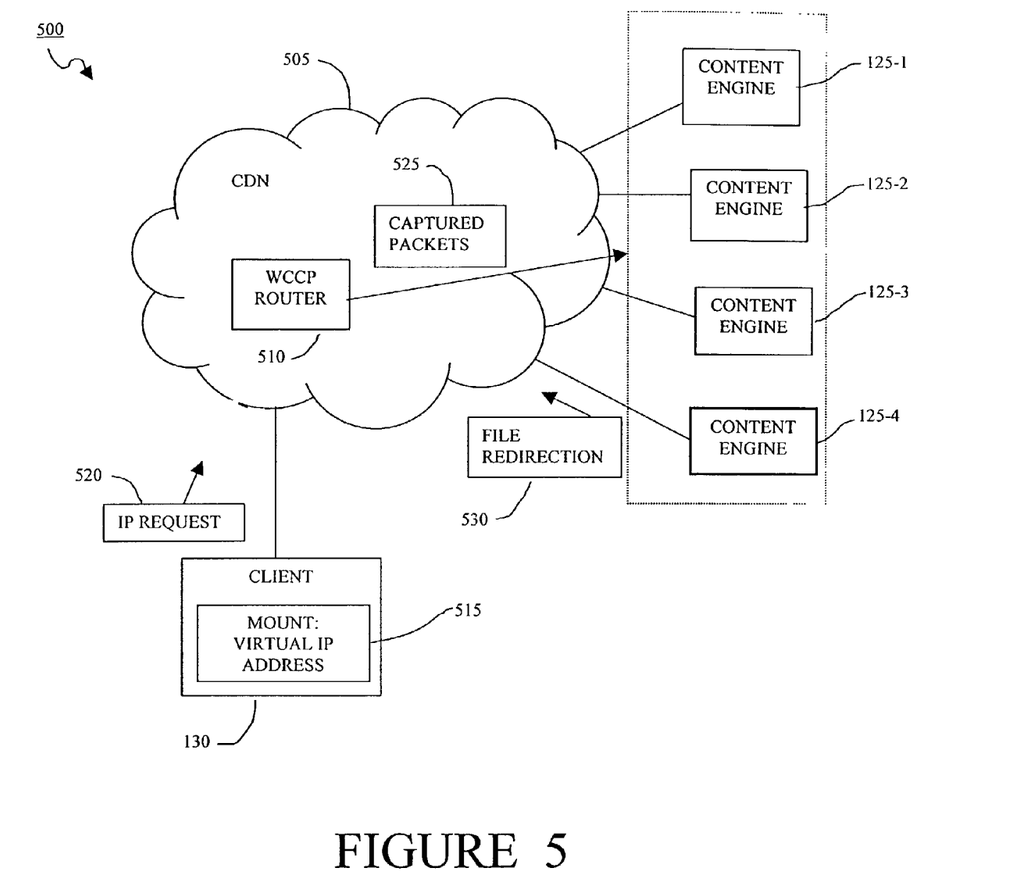
FIG. 5 is a block diagram of another alternative embodiment of the content delivery network of FIG. 1.

FIG. 5 shows a WCCP-enabled alternative embodiment 500 of the invention that uses WCCP to capture and process the packets of the file protocol. A CDN 505 has a WCCP-enabled router 510. The client 130, connected to the network 505, is configured to mount the file contents of the CDN 505 using NFS or CIFS by a standardized (or global) virtual IP address 515. A cluster of content engines 125 is also connected to the CDN 505. WCCP is configured to capture at, for example, the WCCP-enabled router 510, the UDP (or TCP) traffic 520 destined for the virtual IP address 515. At the cost of handling 100% of these incoming file protocol packets, the load-balancing cluster of content engines 125 forwards the captured packets 525 to a "best" content engine 125-4 selected through the use of content-routing methods or similar server-selection methods.

In an alternative embodiment of the invention, the next-to-last server (or content router, such as the router 135 of FIG. 1) provides the HTTP redirection containing the URL in, for example, the "file:" format, instead of redirecting to the content engine 125 (which is the last server) and having the content engine 125 provide that redirection. This alternative embodiment can save one redirection, but requires that client-server file protocol configuration information sufficient to calculate the "mount-path" be stored in the content routers or that it be communicated to the content routers by the content engines. The file names are handled at some level above the content engine. The level above the content engine 125 knows all the mount point names and all the content engines and the fileservers in order to handle file names at a higher level.

The CDN in another alternative embodiment can be used by the client for storage as well as for data access. The CDN redirects client requests to the content engine using HTTP. The content engine 125 provides a redirection of the type file:/url that describes a mount point so that the client 130 communicates directly to the content engine 125. With the right permissions, the client can save a file at the content engine 125. The client protocols of FIG. 3 apply in this alternative embodiment.

Figure 6:
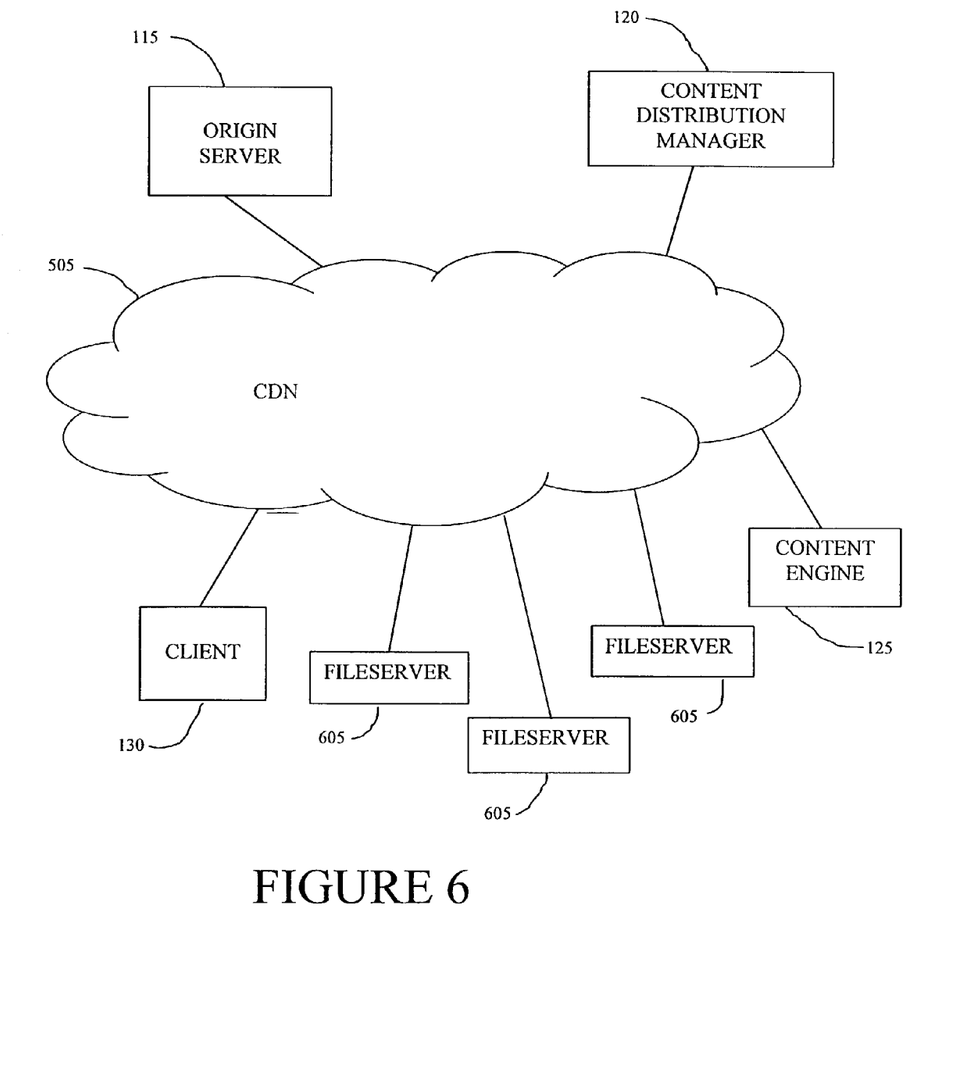
FIG. 6 is a block diagram of the content delivery network of FIG. 1 combined with a distributed file system.

FIG. 6 shows an alternative embodiment of the invention in which the CDN 505 is combined with a distributed file system. FIG. 6 shows the origin server 115, content distribution manager 120, client 130, and content engine 125 all connected to the CDN 505. In addition, a plurality of fileservers 605 is connected to the CDN 505. In this embodiment of the invention, the content engine 125 does not give a last redirection redirecting the client 130 to the content engine 125. Instead, the content engine 125 provides a redirection to the client 130 directing the client 130 to a particular fileserver of the plurality of fileservers 605. In this system, the content engines acts like a last hop content router.

The present invention enables a client system to read a file from a content engine in a CDN as though the content engine were mounted on the client. With this system, a file anywhere in the CDN can be made readily accessible even when the client moves within the CDN. The HTTP, WCCP, and FTP protocols are provided merely as example protocols. The invention is not limited to the protocols listed herein.

Figure 7:
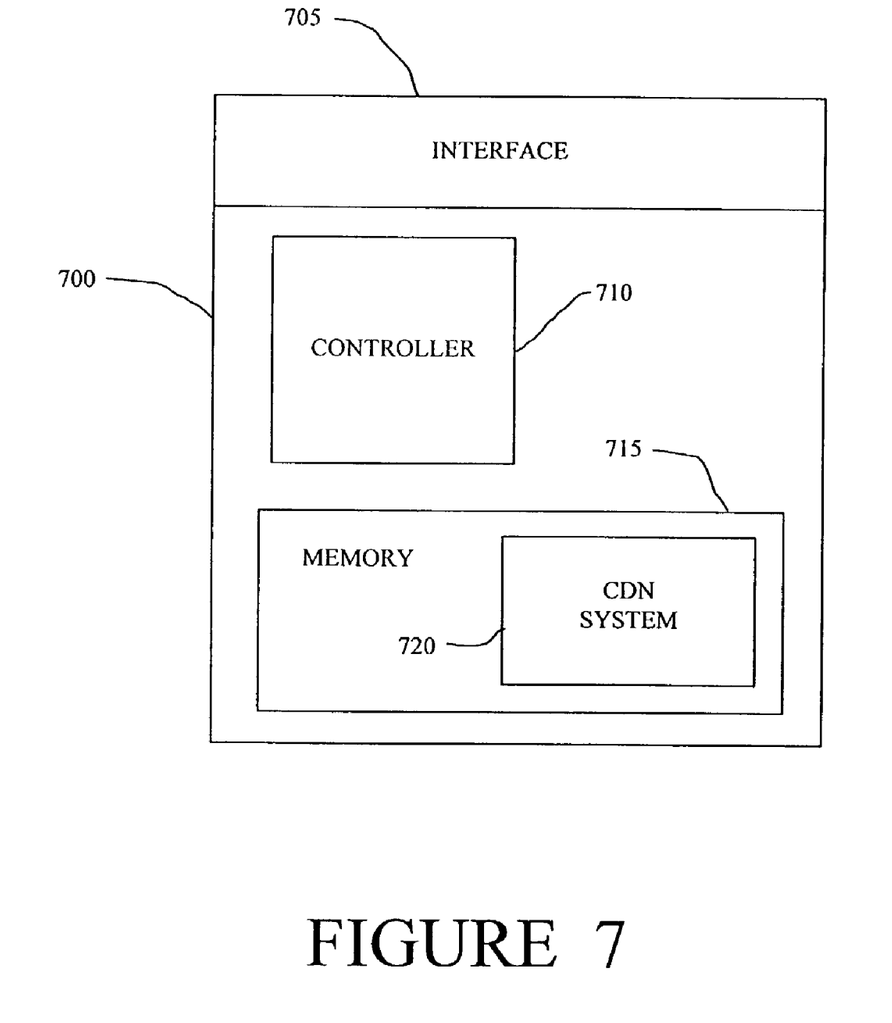
FIG. 7 is a block diagram of a computer system configured to operate the content delivery network of FIG. 1.

Other embodiments of the invention include a computer system, such as a data communications device, computerized device, or other devices configured with software and/or circuitry to process and perform all of the method operations noted above and disclosed herein as embodiments of the invention. In such embodiments, the device, such as a data communications device 700 shown in FIG. 7 comprises at least one communications interface 705 (e.g., a network interface), a memory 715 (e.g., any type of computer readable medium, storage or memory system), a processor (or controller 710) and an interconnection mechanism connecting the communications interface, the processor and the memory. In such embodiments, the memory system is encoded with a content delivery network system 720 that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a content-routed distributed file system that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for routing a data request by a network server device, comprising the steps of:

receiving a Web protocol data request at the network server device;

providing a file protocol redirection to a requesting client in response to said Web protocol data request; and transferring, to the requesting client, data requested in said Web protocol data request using a file access protocol specified in said file protocol redirection;

wherein said providing step further comprises converting the Web protocol data request to a file access path indicating that the requesting client use the file access protocol to request the data, and transmitting the file access path to the requesting client using the Web protocol; and wherein said transferring step further comprises the steps of:

receiving, from said requesting client, a second data request in response to said file protocol redirection, said second data request requesting data transfer in the file access protocol specified in said file protocol redirection, and transferring data, requested by the requesting client, to said requesting client in response to said second data request using the file access protocol.

2. The method of claim 1, wherein:

receiving the Web protocol data request at the network server comprises receiving a Hyper Text Transfer Protocol data request at the network server;

converting the Web protocol data request to the file access path indicating that the requesting client use the file access protocol to request the data comprises converting the Hyper Text Transfer Protocol data request into a file protocol redirection message, the file protocol redirection message including the file access path that is operable to direct the requesting client to use the file access protocol, specified in the file access path, to request the data;

transmitting the file access path to the requesting client using the Web protocol comprises transmitting the file protocol redirection message to the requesting client using the Hyper Text Transfer Protocol; and receiving the second client data request in response to said file protocol redirection comprises receiving the second client data request from the requesting client in response to transmitting the file protocol redirection message, the second client data request requesting access to the file access path included in the file protocol redirection message via the file protocol specified in the file protocol redirection message.

3. The method of claim 2, wherein:

converting the Hyper Text Transfer Protocol data request into a file protocol redirection message comprises converting the Hyper Text Transfer Protocol data request into a file transfer protocol (FTP) redirection message, the FTP redirection message including the file access path that is operable to direct the requesting client to use the FTP protocol, specified in the file access path, to request the data;

transmitting the file protocol redirection message to the requesting client using the Hyper Text Transfer Protocol comprises transmitting the FTP redirection message to the requesting client using the Hyper Text Transfer Protocol; and receiving the second client data request from the requesting client in response to transmitting the file protocol redirection message, comprises receiving the second client data request from the requesting client in response to transmitting the FTP redirection message, the second client data request requesting access to the file access path included in the file protocol redirection message via the FTP protocol specified in the FTP redirection message.

4. The method of claim 1 wherein said Web protocol is Hypertext Transfer Protocol.

5. The method of claim 1 wherein said Web protocol is Web Cache Communication Protocol.

6. The method of claim 1 wherein said file protocol redirection is an HTTP redirection to file transfer protocol (FTP).

7. The method of claim 1 wherein said file protocol redirection is an HTTP redirection to Common Internet File System (CIFS).

8. The method of claim 1 wherein said file protocol redirection is an HTTP redirection to Network File System (NFS).

9. The method of claim 1 wherein the step of providing said file redirection further comprises the step of determining the file protocol in response to an identity of the requesting client.

10. The method of claim 1 wherein the step of providing said file redirection further comprises the step of determining the file protocol in response to a configuration of the requesting client.

11. The method of claim 1 wherein said network server device is a content engine in a content delivery network.

12. The method of claim 1 wherein said network server device is a network attached storage device.

13. The method of claim 1, further comprising, in response to transmitting, receiving a file access protocol data request from the requesting client, via the file access protocol.

14. The method of claim 1, wherein, when the file access path specifies a File Transfer Protocol as the file access protocol, the file access path has a format "ftp://hostname/path/directory/filename.ext" and wherein, when the file access path specifies one of a Common Internet File System and a Network File System (NFS) as the file access protocol, the file access path has a format "file://mount-path/directory/filename.ext."

15. The method of claim 1, wherein:

receiving a Web protocol data request at the network server comprises receiving a Hypertext Transfer protocol data request at the network server; and providing the file protocol redirection in response to said Web protocol data request comprises providing a mount path redirection in response to said Hypertext Transfer protocol data request, a mount path of the mount path redirection being based on a identity of a requesting client, configuration parameters that indicate a file access protocol to be used to access a file, and a configuration of the client to mount file server volumes.

16. The method of claim 1, wherein:

receiving a Web protocol data request at the network server device comprises receiving a client request Uniform Resource Locator (URL); and converting the Web protocol data request to a file access path indicating that the requesting client use the file access protocol to request the data comprises converting the client request URL to the file access path indicating that that requesting client use the file access protocol to request the data.

17. A system device for routing a data request, comprising:

means for receiving a Web protocol data request;

means for providing a file protocol redirection to a requesting client in response to said Web protocol data request; and means for transferring, to the requesting client, data requested in said Web protocol data request using a file access protocol specified in said file protocol redirection;

wherein said means for providing further comprises means for converting the Web protocol data request to a file access path indicating that the requesting client use the file access protocol to request the data, and means for transmitting the file access path to the requesting client using the Web protocol; and wherein said means for transferring further comprises:

means for receiving, from said requesting client, a second data request in response to said file protocol redirection, said second data request requesting data transfer in the file access protocol specified in said file protocol redirection, and means for transferring data, requested by the requesting client, to said requesting client in response to said second data request using the file access protocol.

18. The system device of claim 17 wherein said Web protocol is Hypertext Transfer Protocol.

19. The system device of claim 17 wherein said Web protocol is Web Cache Communication Protocol.

20. The system device of claim 17 wherein said file protocol redirection is an HTTP redirection to file transfer protocol.

21. The system device of claim 17 wherein said file protocol redirection is an HTTP redirection to Common Internet File System.

22. The system device of claim 17 wherein said file protocol redirection is an HTTP redirection to Network File System.

23. The system device of claim 17 wherein said means for determining the file protocol further comprises means for determining the file protocol in response to an identity of the requesting client.

24. The system device of claim 17 where is means for providing a file redirection further comprises means for determining the file protocol in response to a configuration of the requesting client.

25. A computer program product having a computer-readable medium including computer program logic encoded thereon that, when performed on a computer system device having a coupling of a memory, a processor, and at least one communications interface, provides a method for routing a data request by performing the operations of:
　receiving a Web protocol data request at a network server;
　providing a file protocol redirection to a requesting client for said Web protocol data request; and
　transferring to the requesting client data requested in said Web protocol data request using a file access protocol specified in said file protocol redirection;
　wherein providing further comprises:
　　converting the Web protocol data request to a file access path indicating that the requesting client use the file access protocol to request the data, and
　　transmitting the file access path to the requesting client using the Web protocol; and
　wherein transferring further comprises:
　　receiving, from the requesting client, a second data request in response to said file protocol redirection, said second data request requesting data transfer in the file access protocol specified in said file protocol redirection, and
　　transferring data, requested by the requesting client, to said requesting client in response to said second data request using the file access protocol.

26. The computer program product of claim 25, wherein:
receiving a Web protocol data request at the network server comprises receiving a Hypertext Transfer protocol data request at the network server; and
providing the file protocol redirection in response to said Web protocol data request comprises providing a mount path redirection in response to said Hypertext Transfer protocol data request, a mount path of the mount path redirection being based on a identity of a requesting client, configuration parameters that indicate a file access protocol to be used to access a file, and a configuration of the client to mount file server volumes.

* * * * *

UNITED STATES PATENT AND TRADEMARK OFFICE
CERTIFICATE OF CORRECTION

PATENT NO.        : 7,565,413 B1                                              Page 1 of 1
APPLICATION NO.   : 10/212421
DATED             : July 21, 2009
INVENTOR(S)       : James W. O'Toole, Jr.

It is certified that error appears in the above-identified patent and that said Letters Patent is hereby corrected as shown below:

On the Title Page, Item (54)
TITLE: CONTENT REQUEST REDIRECTION FROM A WED PROTOCOL TO A FILE PROTOCOL should read -- CONTENT REQUEST REDIRECTION FROM A WEB PROTOCOL TO A FILE PROTOCOL --.

Item (56)
OTHER PUBLICATIONS: Sylvia Elliott, Caching in on Web surfing, Summer Semester 2001, Computer Review, University Computing and Networking Services, 3 pages. Cooper et al., Internet Web Replication and Caching Taxonomy, RFC 3040, Jan. 2001, Network Working Group, 32 pages. should read:
-- Caching in on Web surfing, Summer Semester 2001, Computer Review, University Computing and Networking Services, 3 pages --.
-- Cooper et al., Internet Web Replication and Caching Taxonomy, RFC 3040, Jan. 2001, Network Working Group, 32 pages. --.

Item (56)
OTHER PUBLICATIONS: Cisco Systems, Cisco Application and Content Networking System (ACNS) Software v4.2 Product Family: Enterprise Edition, Datasheet, Cisco Systems, Inc., 16 pages. Christophe Deleuze, Content Networks, Cisco Systems, Inc., The Internet Protocol Journal, vol. 7, No. 2,1992-205, 6 pages.
should read:
-- Cisco Systems, Cisco Application and Content Networking System (ACNS) Software v4.2 Product Family: Enterprise Edition, Datasheet, Cisco Systems, Inc., 16 pages. --.
-- Christophe Deleuze, Content Networks, Cisco Systems, Inc., The Internet Protocol Journal, vol. 7, No. 2, 1992-205, 6 pages. --.

Signed and Sealed this

First Day of September, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,565,413 B1 | Page 1 of 2 |
| APPLICATION NO. | : 10/212421 | |
| DATED | : July 21, 2009 | |
| INVENTOR(S) | : James W. O'Toole, Jr. | |

It is certified that error appears in the above-identified patent and that said Letters Patent is hereby corrected as shown below:

On the Title Page, Item (54) and Column 1, lines 1 and 2
TITLE: CONTENT REQUEST REDIRECTION FROM A WED PROTOCOL TO A FILE PROTOCOL should read -- CONTENT REQUEST REDIRECTION FROM A WEB PROTOCOL TO A FILE PROTOCOL --.

Item (56)
OTHER PUBLICATIONS: Sylvia Elliott, Caching in on Web surfing, Summer Semester 2001, Computer Review, University Computing and Networking Services, 3 pages. Cooper et al., Internet Web Replication and Caching Taxonomy, RFC 3040, Jan. 2001, Network Working Group, 32 pages. should read:
-- Caching in on Web surfing, Summer Semester 2001, Computer Review, University Computing and Networking Services, 3 pages --.
-- Cooper et al., Internet Web Replication and Caching Taxonomy, RFC 3040, Jan. 2001, Network Working Group, 32 pages. --.

Item (56)
OTHER PUBLICATIONS: Cisco Systems, Cisco Application and Content Networking System (ACNS) Software v4.2 Product Family: Enterprise Edition, Datasheet, Cisco Systems, Inc., 16 pages. Christophe Deleuze, Content Networks, Cisco Systems, Inc., The Internet Protocol Journal, vol. 7, No. 2,1992-205, 6 pages.

UNITED STATES PATENT AND TRADEMARK OFFICE
CERTIFICATE OF CORRECTION

PATENT NO. : 7,565,413 B1
APPLICATION NO. : 10/212421
DATED : July 21, 2009
INVENTOR(S) : James W. O'Toole, Jr.

It is certified that error appears in the above-identified patent and that said Letters Patent is hereby corrected as shown below:

should read:
-- Cisco Systems, Cisco Application and Content Networking System (ACNS) Software v4.2 Product Family: Enterprise Edition, Datasheet, Cisco Systems, Inc., 16 pages. --.
-- Christophe Deleuze, Content Networks, Cisco Systems, Inc., The Internet Protocol Journal, vol. 7, No. 2, 1992-205, 6 pages. --.

This certificate supersedes the Certificate of Correction issued September 1, 2009.

Signed and Sealed this

Twenty-second Day of September, 2009

David J. Kappos
*Director of the United States Patent and Trademark Office*